C. M. WEST.
ATTACHMENT FOR COOKING UTENSILS.
APPLICATION FILED NOV. 2, 1915.
1,261,878.
Patented Apr. 9, 1918.
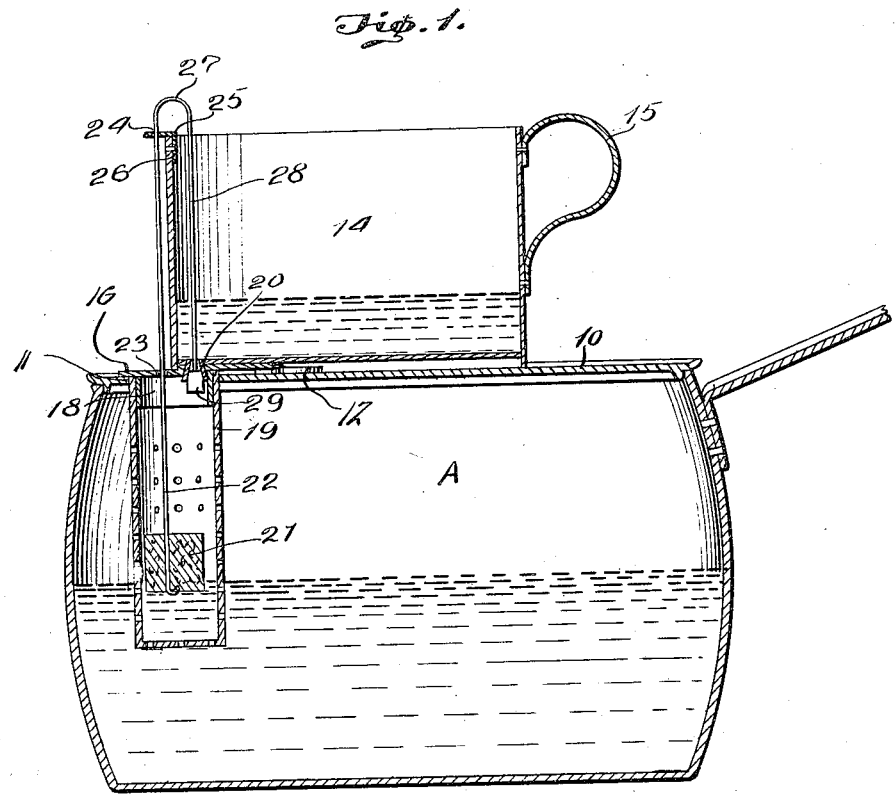
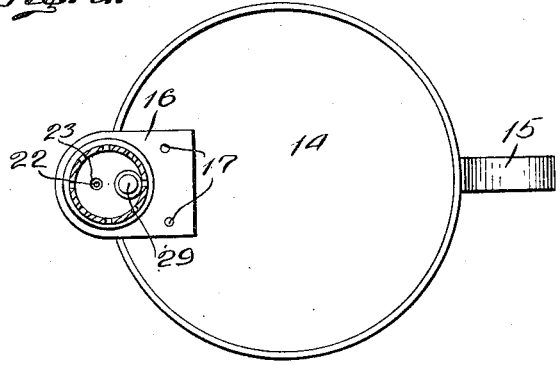
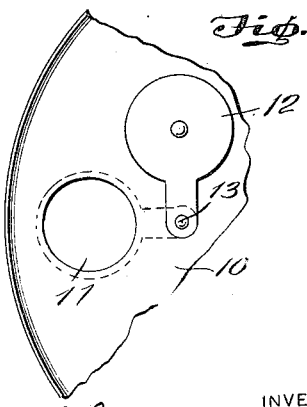
WITNESSES
Edw. S. Hall.
J. Reavey Kelley
INVENTOR
Clyde M. West.
BY Richard Owen.
ATTORNEY

UNITED STATES PATENT OFFICE.

CLYDE M. WEST, OF PIOCHE, NEVADA.

ATTACHMENT FOR COOKING UTENSILS.

1,261,878.  Specification of Letters Patent.  Patented Apr. 9, 1918.

Application filed November 2, 1915. Serial No. 59,269.

*To all whom it may concern:*

Be it known that I, CLYDE M. WEST, a citizen of the United States, residing at Pioche, in the county of Lincoln and State of Nevada, have invented certain new and useful Improvements in Attachments for Cooking Utensils, of which the following is a specification.

An object of the present invention is to provide an improved attachment for cooking utensils that comprehends a device for consonantly and uniformly feeding or admitting water, or other fluid, to the utensil to replace the amount of the liquid contents of the utensil absorbed by evaporation during the cooking operation; firstly, to assure a uniform amount of liquid in the utensil at all times to expedite cooking of the food contained therein, and; secondly, to guard against and prevent burning the food being cooked such as is caused by the entire evaporation of the liquid contents of the utensil.

Another object is to provide improved means to act in conjunction with the utensil to facilitate the correct positioning of the feeding apparatus thereon and to provide for the easy and quick removal thereof, should the operator so desire.

A further object is to so mount the device in connection with the utensil that the valve controlling the admission of liquid from the tank to the utensil will be opened and closed consistently with the fall and rise of the level of the liquid contents thereof, and provide for the positive and effectual actuation of the valve especially at the time the contents of the utensil is in a state of agitation.

A still further object of my invention is to provide an improved device of the character set forth above that is extremely simple in construction, strong and durable and highly practical from both the standpoint of the manufacturer and the standpoint of the user; and, which it is believed, may be manufactured at a minimum cost.

Various other objects and advantages will become apparent during the continuance of the following description.

The above and other objects which will become apparent, are accomplished by such means as are known in their preferred form in the accompanying drawings, described in the following specification and then more specifically pointed out in the appended claims.

In the accompanying drawings wherein like characters designate like parts throughout the several views:

Figure 1 is a view in vertical cross section illustrating my invention in connection with a cooking utensil of substantially the conventional form;

Fig. 2 is a horizontal sectional view of my invention taken through the float protecting casing looking upwardly toward the bottom of the liquid container;

Fig. 3 is a fragmentary view of the utensil lid showing the same constructed to receive and support my invention.

In the drawings A designates the utensil in connection with which my invention is shown, this being of substantially the conventional form and selected in order to facilitate the proper illustration of my invention. It will be understood, therefore, that I am not limited to the use of my invention in connection with a utensil of this specific form or configuration in view of the fact that the same may be advantageously employed in connection with other forms of cooking devices when it is so desired.

In connection with the receptacle or utensil A, I have shown a lid or cover 10 upon which may be mounted the body portion of my invention. In order to accommodate the float protecting casing of my invention, the construction of which will be hereinafter set forth, the lid 10 is provided with a receiving opening 11; yet in order to provide for the proper closing of this opening when my invention is not in use, the lid 10 carries a pivoted cover 12 as at 13.

My invention consists more essentially of a container 14 which carries a suitable handle 15 by which it may be properly manipulated and is further provided on its under face with a plate 16. The plate 16 is preferably fixed to the bottom of the container 14, such as by means designated by the numeral 17 and made to project slightly beyond the outer wall of the container as clearly shown in Fig. 1. A collar 18 depends from the plate 16 and supports a perforated float protecting casing 19 which, in the use of my invention may be passed through the opening 11 of the lid into the interior of the utensil. The bottom of the container 14 and the plate 16 are provided with coaxial opening through which is mounted a bushing or valve seat 20. The openings in the bottom of the container and the plate 16 permit the contents of the container to enter the utensil by way of the perforated float protecting casing 19.

A float 21 which is formed of a buoyant material, such, for instance, as cork, is mounted to operate in the casing 19 and is supported in an operative position with relation thereto through the medium of a rod 22. The rod 22 is passed upwardly through an opening 23 in the plate 16 and thence through an opening 24 formed in a suitable supporting bracket 25 that is fixed adjacent the upper edge of the container 14 as at 26. Above the bracket 25, the rod 22 is bent as at 27 to provide a portion 28 to extend downwardly to the container 14 and have its end passed through the valve seat 20. As will be noted upon reference to Fig. 1 the lower end of the portion 28 of the rod 22 carries a suitable closure valve 29 for the purpose of normally preventing the contents of the container 14 from passing to the body of the utensil.

By reason of the liquid contents of the utensil A normally tending to buoy up the float 21, the valve 29, under ordinary condition will be held in snug fitting engagement with the seat 20. However, as the level of the liquid in the utensil is lowered, the float 21 will necessarily fall therewith and thus unseat the valve 29. As long as the valve 29 is unseated the contents of the container 14 will be permitted to flow to the body of the utensil by way of the perforated casing 19. Therefore, it will be seen that as soon as the liquid in the utensil again reaches the desired height, the float 21 will operate the valve 29 to stop the flow of liquid from the container 14. Should there be any solid articles mixed with the liquid contents of the utensil, they will not in any way impede the proper movement of the float 21 by reason of the fact that the latter is fully and completely protected by the casing 19. This casing 19 also protects the float when ebullition, and the consequent agitation of the liquid contents of the utensil occurs.

By reason of this removability from the utensil, it will be understood that the utensil may be used independently of the device if it is so desired. When the utensil is used without the device in conjunction with the utensil, the lid opening may be closed by the pivoted cover 12.

From the foregoing, it is believed that the advantages and novel features of my invention will be readily understood and therefore, further detailed description is deemed unnecessary.

In reducing my invention to practice, I find that the form referred to herein is the most practical and preferred embodiment, but realizing that certain conditions will necessarily vary in concurrence with the adoption of my device, I desire to emphasize the fact that various minor changes in the details of construction and in the proportion of parts may be resorted to when required without sacrificing any of the advantages of my invention as defined in the appended claims.

Having thus fully described my invention, what I claim as new and desire to secure by Letters Patent, is:

1. In a device of the character described, the combination with a cooking utensil and a lid therefor, said lid being provided with an opening, of a liquid container associated with said lid, a plate carried by said container, a perforated casing carried by said plate, passed through said lid opening and projecting into the body portion of said utensil, means to conduct liquid from said container through said plate to said casing, and float actuated means to control the flow of liquid through said liquid conductor in response to the rise and fall of the level of the liquid contents of said utensil.

2. In a device of the character described, the combination with a cooking utensil and a lid therefor having an opening formed therein, of a liquid container associated with said utensil, a plate fixed to said container, a perforated casing carried by said plate and passing through said lid opening to project interiorly of said utensil, means to conduct liquid from said container to said casing whereby it will be permitted to flow into said utensil, and float actuated means to open and close said conducting means in response to the fall and rise of the level of the liquid contents of said utensil.

3. In a device of the character described, the combination with a cooking utensil and a cover therefor, said cover being provided with an opening, of a liquid container associated with said cover, a plate fixed to the under side of said container, a perforated casing carried by said plate and passing through said cover opening and extending into the body of said utensil, the bottom of said container and said plate being provided with coaxial openings, a valve seat positioned through said openings and providing a conduit, a float mounted to operate in said casing, a valve associated with said valve seat, a rod connecting said float and said valve, and said float adapted to open and close said valve in response to the fall and rise of the level of the liquid contents of said utensil.

In testimony whereof I affix my signature in presence of two witnesses.

CLYDE M. WEST.

Witnesses:
C. W. GARRISON,
DAN J. RONNON.

Copies of this patent may be obtained for five cents each, by addressing the "Commissioner of Patents, Washington, D. C."